United States Patent Office 3,349,433
Patented Oct. 31, 1967

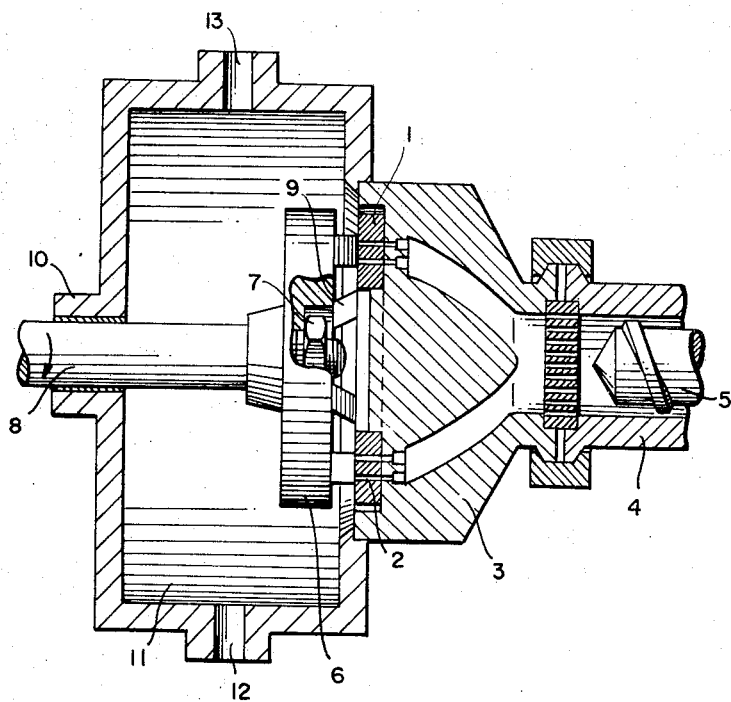
INVENTORS:
HEINZ SCHIPPERS
WALTER NIEMEYER

3,349,433
DEVICE FOR GRANULATING EXTRUDED POLYMERS
Heinz Schippers, Remscheid-Lennep, and Walter Niemeyer, Remscheid, Germany, assignors to Barmer Maschinenfabrik Aktiengesellschaft, Wuppertal-Oberbarmen, Germany
Filed Nov. 15, 1965, Ser. No. 507,834
Claims priority, application Germany, Nov. 24, 1964, B 59,797
3 Claims. (Cl. 18—12)

ABSTRACT OF THE DISCLOSURE

An underwater granulator for cutting an extruded polymer having one or more rotating knife blades moving over the face of the die from which the polymer strand is extruded wherein at least the face of the die is composed of nodular cast iron.

---

This invention relates to a device for granulating or pelletizing a synthetic thermoplastic polymer as it is extruded in the form of a continuous strand, and more particularly, the invention is directed to an improvement in this granulating device for substantially reducing the wear on the rotating knife edges which cut the polymer strand into granules or pellets, especially in a device where the granulation takes place under water.

It is common practice to extrude thermoplastic materials, especially synthetic polymers, under elevated temperatures and pressures through openings or bores suitably arranged in a die or nozzle plate and then cut the extruded strands with a rotating granulating knife which is mounted so as to exert a light pressure on the front side or face of the die plate or else is spaced at only a very slight interval from the die face. The granulating knife usually consists of several knife blades in a radial symmetric arrangement on a rotating head so that as the knife blades rotate at a predetermined speed the cutting edges of these blades sweep through a circular or ring-shaped area on the die face containing a plurality of extrusion bores. In this manner, the extruded strands of polymer are continuously cut to a uniform length of predetermined pellet size.

It is known that the useful lifetime of the cutting blades is very short when these blades are actually in continuous rotary contact with the die face. Even in those devices in which the blades are spaced at a slight interval from the die face, the cutting edges are frequently damaged and rapidly impaired because they unavoidably come in contact or strike upon the die face from time to time as a result of the relatively high processing temperatures and the correspondingly uncontrolled expansion of the various machine elements. However, in order to achieve a precise cutting action and a uniform size and shape of the granular particles or pellets, it is thus quite essential to prolong the life of the cutting edges as much as possible. For economical reasons alone, it is undesirable to frequently change the knife blades in the granulating device, and complex means for adjusting the spacing of the cutting edges from the face of the die do not provide an adequate remedy.

The object of the present invention is to provide a means for preventing excessive wear of the rotating knife blades in this type of granulating device.

The improvement according to the invention arose from the knowledge gained through experimentation that the specific material used in the construction of the die face has a considerable influence on the lifetime of the granulating knife. It was thus found, in accordance with the improvement of this invention that the die plate or at least the face portion thereof should be composed of nodular cast iron, this improvement being especially desirable when the die face is located within a water chamber.

The improvement is further illustrated by the accompanying drawing which is a partly schematic side elevation, partly in cross-section along the axis of the granulating device, showing one end of the extruder as attached to an underwater granulator.

In the drawing, the annular or ring-shaped nozzle or die plate 1 consising of nodular cast iron and containing a number of board holes or openings 2 is seated tightly in the injection head 3 of the extruder by means of screws or any similar fastening means (not shown). The extruder also includes a conventional barrel or cylindrical housing 4 in which the screw 5 conveys the molten polymer under elevated temperatures and pressures through conventional passageways to the extrusion openings 2. A rotary tool head 6 is fastened by means of the screwnut 7 on the rotatable drive shaft 8 and is engaged axially in such a manner that the granulating knives mounted on the tool head rotate at a very slight interval from the ring-shaped smooth surface of the die plate 1. The drive shaft 6 is rotatably seated and sealed in a suitable bearing at 10 in the wall of the granulator or water chamber 11. The water chamber 11 contains two channels 12 and 13 for the introduction and removal of cooling water which also transports the cut granules or pellets away from the cutting device and out of the water chamber.

The material employed in the construction of the die plate 1, i.e. at least the face portion of the extrusion die, is a form of gray cast iron which is usually referred to as nodular cast iron although it is also identified by several other names including "spherulitic graphite iron." In this type of cast iron, the graphite is present in the form of very small balls or spherulites, as compared to the laminar or flake form of graphite contained in gray cast iron. In addition to the iron content of nodulr cast iron, typical compositions have about 3.2 to 4.1% total carbon, 1.8 to 2.8% silicon, up to 0.8% manganese, not more than 0.10% phosphorus and not more than 0.3% sulfur. See, for example, "Metals Handbook," 8th ed., vol. 1 (properties and Selection of Metals), American Society for Metals, Metals Park, Ohio (1961), pp. 379–394, "Nodular Cast Iron."

For purposes of the present invention, it is desirable to employ a nodular cast iron with the following composition:

| | Percent by weight |
|---|---|
| Total carbon | 3.7±0.05 |
| Silicon | 2.3–2.6 |
| Manganese | 0.4±0.1 |
| Phosphorus | ≯0.05 |
| Sulphur | ≯0.001 |

The following properties are also preferred in the nodular cast iron used as the face of the die:

| | | |
|---|---|---|
| Tensile strength | kg./mm.$^2$ | 50–60 |
| Yield point | kg./mm.$^2$ | 35–45 |
| Elongation | percent | 7–20 |
| Hardness (HBN) | kg./mm.$^2$ | 170–240 |
| Flexural strength | kg./mm.$^2$ | 85–110 |
| Modulus of elasticity | kg./mm.$^2$ | 17–18×10$^3$ |
| Impact strength (Charpy): | | |
|    Unnotched (+20° C.) | mkg./cm.$^2$ | 2–10 |
|    Unnotched (−40° C.) | mkg./cm.$^2$ | 0.5–5 |
|    Notched (DVM) | mkg./cm.$^2$ | 0.5–2.5 |

Nodular cast iron as the material used in the construction of the die plate is distinguished by various advantages in comparison to other materials, especially steel as previously used in such dies. This particular form of cast iron containing spherulitic graphite has a relatively high tensile strength sufficient to resist the pressures developed by the thermoplastic material during extrusion. At the same time, by using nodular cast iron in the die face, it is possible to bring about a considerable reduction in the wear of the cutting edges of the rotating knife blades during their at least partial wearing contact with the die face so as to avoid replacement of these blades at frequent intervals. Also, nodular cast iron is sufficiently resistant to corrosion and pitting to be especially useful in underwater granulators.

Most surprisingly, the useful life of the nodular cast iron plate is just as long as that of previously used steel plates, and this advantage was not expected in view of the intermittent or continuous scraping of the cutting edges of the knife blades on this relatively softer material. In this respect, the resistance to wear by the die plate itself composed of nodular cast iron is a property which was not predictable under the normal operating conditions of extrusion granulators, and it is thus possible to achieve a substantial extension in the useful life of the knife blades without reducing the effectiveness and durability of the die plate.

The invention is hereby claimed as follows:

1. In a device for the granulation of an extruded thermoplastic material by means of at least one rotating knife blade moving over the surface of a die face from which a polymer strand is extruded, wherein said die face is in at least partial wearing contact with said knife blade, the improvement of said extruder die having at least the face portion thereof composed of nodular cast iron.

2. A device as claimed in claim 1 wherein said nodular cast iron die face is constructed as an annular ring seated in the injection head of an extruder.

3. A device as claimed in claim 1 wherein said die face is located within an enclosed chamber adapted to permit cooling water to flow therethrough.

References Cited
UNITED STATES PATENTS

| | | | |
|---|---|---|---|
| 2,594,894 | 4/1952 | Fehrenbach | 18—12 |
| 2,850,764 | 9/1958 | Evans et al. | |
| 2,862,243 | 12/1958 | Farr et al. | |
| 3,114,169 | 12/1963 | Palmer et al. | 18—12 |
| 3,271,821 | 9/1966 | Street | 18—12 |

WILLIAM J. STEPHENSON, *Primary Examiner.*

UNITED STATES PATENT OFFICE
CERTIFICATE OF CORRECTION

Patent No. 3,349,433                      October 31, 1967

Heinz Schippers et al.

It is hereby certified that error appears in the above numbered patent requiring correction and that the said Letters Patent should read as corrected below.

Column 2, line 39, for "0.3% sulfur" read -- 0.03% sulfur --.

Signed and sealed this 21st day of January 1969.

(SEAL)

Attest:

Edward M. Fletcher, Jr.
Attesting Officer

EDWARD J. BRENNER
Commissioner of Patents